US012012318B2

(12) United States Patent
Gottin et al.

(10) Patent No.: US 12,012,318 B2
(45) Date of Patent: Jun. 18, 2024

(54) TWO-LEVEL EDGE-BASED HAZARD ALERT SYSTEM BASED ON TRAJECTORY PREDICTION

(71) Applicant: Dell Products L.P., Round Rock, TX (US)

(72) Inventors: Vinicius Michel Gottin, Rio de Janeiro (BR); Pablo Nascimento da Silva, Niterói (BR); Paulo Abelha Ferreira, Rio de Janeiro (BR)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/647,758

(22) Filed: Jan. 12, 2022

(65) Prior Publication Data

US 2023/0219796 A1 Jul. 13, 2023

(51) Int. Cl.
*B66F 17/00* (2006.01)
*G08B 21/18* (2006.01)

(52) U.S. Cl.
CPC .......... *B66F 17/003* (2013.01); *G08B 21/182* (2013.01)

(58) Field of Classification Search
CPC ............................ B66F 17/003; G08B 21/182
USPC ....................................................... 340/686.6
See application file for complete search history.

(56) References Cited

U.S. PATENT DOCUMENTS 6,393,362 B1 * 5/2002 Burns .................. G05D 1/0297 701/119
8,169,335 B2 * 5/2012 Frederick ........... G08B 21/0213 340/691.7
9,547,969 B2 * 1/2017 Beggs .................... B60Q 9/008
2009/0109049 A1 * 4/2009 Frederick ........... G08B 21/0213 340/686.6
2010/0208064 A1 8/2010 Liu et al.
2010/0228427 A1 * 9/2010 Anderson ......... B60W 50/0098 701/1
2011/0010023 A1 * 1/2011 Kunzig ................ G05D 1/0234 701/2
2011/0093134 A1 * 4/2011 Emanuel .............. G05D 1/0289 701/2
2011/0279261 A1 * 11/2011 Gauger ................. B66F 9/0755 340/669
2012/0025964 A1 * 2/2012 Beggs .................... G08G 1/166 340/435
2012/0083947 A1 * 4/2012 Anderson .............. G08G 1/166 701/1
2014/0191869 A1 * 7/2014 Frederick ................ F16P 3/145 340/551

(Continued)

OTHER PUBLICATIONS

B. Alexe, T. Deselaers and V. Ferrari, "Measuring the objectness of image windows," IEEE transactions on pattern analysis and machine intelligence, vol. 11, No. 34, pp. 2189-2202, 2021.

(Continued)

*Primary Examiner* — Zhen Y Wu
(74) *Attorney, Agent, or Firm* — Workman Nydegger

(57) ABSTRACT

A logistics system for generating hazard alerts. Nodes in an environment generate position data. Local alerts are generated based on the node's position data and recent position data concerning other nodes. The position data is sent to a central node, which receives position data from the other nodes. The central node can generate a second level alert and send the alert to at least the affected nodes in the environment.

16 Claims, 14 Drawing Sheets

(56) References Cited

U.S. PATENT DOCUMENTS

| | | | | |
|---|---|---|---|---|
| 2015/0145661 | A1* | 5/2015 | Beggs | B60Q 9/008 340/435 |
| 2016/0129592 | A1* | 5/2016 | Saboo | B25J 15/0625 700/248 |
| 2016/0180713 | A1* | 6/2016 | Bernhardt | B66F 17/003 701/70 |
| 2017/0297569 | A1* | 10/2017 | Nilsson | B60W 50/082 |
| 2017/0337820 | A1* | 11/2017 | Glatfelter | G08G 1/166 |
| 2017/0356596 | A1* | 12/2017 | Frederick | F16P 3/145 |
| 2019/0043351 | A1* | 2/2019 | Yang | G06F 18/24133 |
| 2021/0273858 | A1 | 9/2021 | Radovanovic et al. | |

OTHER PUBLICATIONS

B. McMahan, E. Moore, D. Ramage, S. Hampson and B. y Arcas, "Communication-efficient learning of deep networks from decentralized data.," In Artificial Intelligence and Statistics, pp. 1273-1282, 2017.

C. L. Zitnick and P. Dollár, "Edge boxes: Locating object proposals from edges.," European conference on computer vision, pp. 391-405, 2014.

J. Bernstein, Y. X. Wang, K. Azizzadenesheli and A. Anandkumar, "signSGD: compressed optimisation for non-convex problems," CoRR, vol. abs/1802.04434, 2021.

K. M. Rashid and A. H. Behzadan, "Risk Behavior-Based Trajectory Prediction for Construction Site Safety Monitoring," Journal of construction engineering and management, 2018.

Li, "Federated learning: Challenges, methods, and future directions," IEEE Signal Processing Magazine, vol. 37, No. 3, pp. 50-60, 2020.

Oza, P., & Patel, V. M. (2019). "C2ae: Class Conditioned Auto-Encoder for Open-set Recognition." In Proceedings of the IEEE/CVF Conference on Computer Vision and Pattern Recognition (pp. 2307-2316).

P. Tang, X. Wang, A. Wang, Y. Yan, W. Liu, J. Huang and A. Yuille, "Weakly supervised region proposal network and object detection," Proceedings of the European conference on computer vision (ECCV), 2018.

U.S. Appl. No. 17/585,055, tilled, Edge-Enabled Trajectory Map Generation, filed Jan. 26, 2022.

U.S. Appl. No. 17/663,423, tilled, "Unsupervised Learning For Real-Time Detection of Far Edge Mobile Device Trajectories", filed May 14, 2022.

"How Accurate Are RFID Systems?"—RFID Journal; (Accessed Oct. 28, 2022).

B. Kim, C. Kang, J. Kim, S. Lee, C. Chung and J. Choi, "Probabilistic vehicle trajectory prediction over occupancy grid map via recurrent neural network," in 20th International Conference on Intelligent Transportation Systems (ITSC), 2017.

C. Hegde, S. Dash and P. Agarwal, "Vehicle Trajectory Prediction using GAN," in Fourth International Conference on I-SMAC (IoT in Social, Mobile, Analytics and Cloud)(I-SMAC) , 2020.

Gal, Yarin, and Zoubin Ghahramani. "Dropout as a Bayesian approximation: Representing model uncertainty in deep learning." international conference on machine learning. PMLR, 2016.

Inpixon—Bluetooth Location Tracking & Positioning, https://www.inpixon.com/technology/standards/bluetooth-low-energy (Accessed Oct. 28, 2022).

Link Labs—"The Complete Active RFID Overview", Mar. 14, 2018.

S. Srikanth, J. Ansari, R. Ram, S. Sharma, J. Murthy and K. Krishna, "Infer: Intermediate representations for furture prediction," in IEEE/RSJ International Conference on Intelligent Robots and Systems (IROS) , 2019.

W. -H. Chung, G. Chakraborty, R. -C. Chen and C. Bornand, "Object Dynamics from Video Clips using YOLO Framework," 2019 IEEE 10th International Conference on Awareness Science and Technology (iCAST), Morioka, Japan, Oct. 23-25, 2019, pp. 1-6, (Year: 2019).

Liu et al, "T-C3D: Temporal Convolutional 3D Network for Real-Time Action Recognition" AAAI, 2018, (Year: 2018).

* cited by examiner

TWO-LEVEL EDGE-BASED HAZARD ALERT SYSTEM BASED ON TRAJECTORY PREDICTION

FIELD OF THE INVENTION

Embodiments of the present invention generally relate to logistics. More particularly, at least some embodiments of the invention relate to systems, hardware, software, computer-readable media, and methods for monitoring objects in an edge environment to facilitate logistics operations.

BACKGROUND

Logistics in environments, such as warehouse environments, can be difficult to monitor and manage at least because many different objects may exist and/or operate simultaneously. Many of the objects in an environment are mobile in nature while other objects may be stationary or fixed. As a result, care should be exercised with regard to the other objects in the environment to help ensure that accidents or other problems do not occur. This can be difficult as many of the objects may operate concurrently and their positions may not be known.

In a warehouse environment, for example, multiple mobile devices may be operating at the same time. Examples of these mobile devices includes forklifts. The forklift operators need to look out for each other in addition to taking care around other objects or hazards such as shelving or storage space, pillars, docks, pallets, and the like. Even if these forklift operators are able to communicate with each other, it is difficult to coordinate the movement of multiple forklifts and ensure that undesirable interactions do not occur.

Operations to ensure safety in an environment can be compromised by communication delays and communication overhead. Effectively performing logistics operations is complex and involves many unknowns in environments such as warehouse environments.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
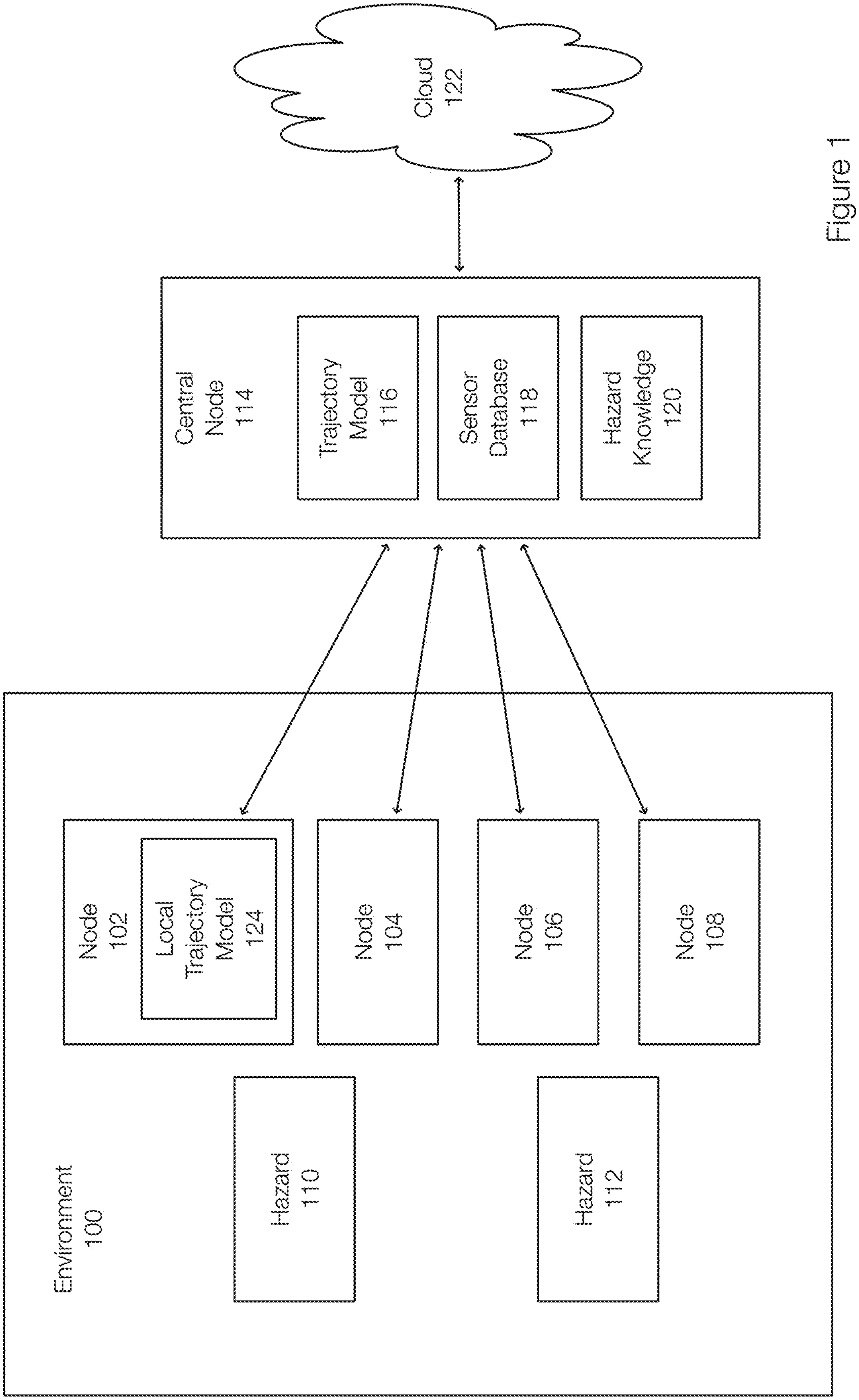
FIG. 1 discloses aspects of a logistics system configured to be implemented in an environment or domain.

Embodiments of the present invention generally relate to logistics. More particularly, at least some embodiments of the invention relate to systems, hardware, software, computer-readable media, and methods for logistics operations including hazard avoidance operations.

Embodiments of the invention can be applied or implemented to provide or perform logistics operations in different types of environments. Generally, an environment may include objects, including mobile objects and/or stationary or static objects. These objects may include or be associated with sensors of varying types that generate data. The data generated by the sensors can be used to perform logistics operations, which include by way of example and not limitation, tracking operations, trajectory prediction operations, alerting operations, positioning operations, object management operations, object monitoring operations, automation operations, safety operations, hazard detection operations, hazard avoidance operations, or the like or combination thereof. More specifically, embodiments of the invention perform logistics based on sensor data generated at edge nodes in an edge environment.

Embodiments of the invention are discussed in the context of an environment such as a warehouse. A warehouse may be associated with multiple objects. Mobile objects may include forklifts and people. Movable objects may include pallets or product. Stationary or static objects may include ports, docks, shelving, corridors, corners, other operational areas, or the like.

From the perspective of a particular object such as a forklift, for example, all other objects may constitute hazards. Hazards, as used herein, does not necessarily refer to dangerous objects. Thus, from the perspective of a specific forklift, hazards include other objects such as other forklifts, people, pallets, zones (e.g., defined areas), docks, corridors, corners, or the like or any combination thereof. Further, the definition of a hazard or object may also be dependent on the environment (or domain).

Embodiments of the invention are achieved, in part, by equipping the objects with hardware such as sensors, processors, memory, networking hardware, or the like. In some examples, the objects may already be equipped with this type of hardware or portions thereof. The hardware of a node may depend on the nature of the associated object. Mobile objects, for example, may be equipped with a different set of sensors compared to sensors or devices associated with a stationary or movable object. For example, hardware such as sensors, processors, memory, or the like may be integrated with a forklift. A pallet, in contrast, may only have an RFID (Radio Frequency Identification) tag.

The hardware (and/or any software thereon) may be referred to as a node. However, reference to a node may also constitute a reference to the object associated with the node and on which the node is attached. Reference to an object may refer to the object and/or the node.

From the perspective of a particular node, other nodes (and their associated objects) in the environment may constitute hazards. Nodes in the environment may be referred to as edge nodes as they operate on the edge of a network and may communicate with a central node operating at a near-edge infrastructure. The central node is typically more computationally powerful than the edge nodes.

Embodiments of the invention provide a multi-stage system that allows alerts to be generated by the edge nodes and by the central node at a near-edge system. The edge nodes may each have sufficient hardware (e.g., processor, memory, networking hardware) to process data generated by the node and/or information about other nodes that is broadcast by the central node. The central node is able to perform more complex and thorough processing of the data generated in the edge environment. The local systems on the edge nodes can generate immediate or first level alerts and the central node at the near-edge system can generate second level alerts that may have a more holistic view and understanding of the objects in the environment.

As previously stated, each node in the environment may be associated with one or more sensors. A forklift, for example, may be associated with a node that includes sensors positioned at various locations on the forklift. The sensors may be placed on the forks or arm (e.g., at the distal ends) and/or on the body of the forklift. This allows the position of the forklift (and of the arms) to be determined. Other information such as height, width, and length of the forklift may also be known and taken into account.

The node associated with a forklift may also include other sensors such as temperature sensors, velocity sensors, motion sensors, acceleration/deceleration sensors, or the like or combination thereof. In general, the sensors associated with a forklift may generate data that can be used to determine a position of the forklift in the warehouse (or its vicinity), velocity, direction of travel, or the like. The sensor data may be processed at the node and/or at the central node to determine a position of the forklift and/or predict a trajectory of the forklift. The current position and/or the predicted trajectory may be used to determine whether or not to generate an alert.

Movable objects such as pallets or products may be associated with a node that includes RFID tags such that the positions of objects such as pallets can be read and tracked in the environment. Personal cellular phones may be used to track the positions of people in the environment. The locations of other objects such as docks, corridors, or the like does not change and is known or programmed into the edge nodes and the central node that are performing logistics operations.

The warehouse is an example of a dynamic edge environment in which quickness and accuracy in decision making (including safety related decisions) is important. Embodiments of the invention provide a logistics system to monitor objects in the environment, project the trajectories or the objects, and alert drivers or other entities when a potential collision or other problem with respect to other objects or hazards is detected. Data originating at the objects is collected from the objects (or from the associated node) and processed using computing resources of the node. Data from all objects may be received by a central node (e.g., container(s), physical machine(s), server(s), virtual machine (s)) operating at a near-edge infrastructure and processed using resources of the near-edge infrastructure.

Embodiments of the invention may operate in stages to ensure that decisions are accurate and timely. More specifically, embodiments of the invention are able to provide an immediate or quick evaluation of the sensor data at each node, which may be followed by a more accurate or more holistic evaluation of the data at the central node. This allows for both fast and accurate decision making in the environment and also allows for holistic decision making.

In one example, data collected at the near edge from sensors deployed at the edge can be aggregated at the near edge infrastructure to train a trajectory model. The trained trajectory model may operate at the near-edge. The trained trajectory model (or a version thereof, e.g., a compressed version) may also be deployed to at least some of the nodes, including mobile nodes. The trajectory model may be deployed to mobile nodes.

During operation, sensor or position data is received by the central node from all or many nodes in the environment (information about fixed hazards such as pillars or other environmental infrastructure may not be collected as it is stored and does not change). Data is typically collected from objects shows positions may change (e.g., forklifts, pallets, product, people). The collected information may be broadcast by the central node to the edge nodes. This allows the positions and trajectories of the mobile objects to be tracked and/or predicted at the central node and/or at the edge nodes. Alerts are generated based on the positions and/or predicted trajectories in one embodiment. For example, a forklift driver may receive an alert indicating that the driver's forklift is heading towards a hazard such as other forklifts, people, platforms, docks, or the like in a predictive and preemptive manner.

This implementation allows for at least two levels of alarms. The first level of alarm is based on the predictions of the local trajectory model and is performed at the forklift (or other similarly equipped object). The local trajectory model can provide a quick assessment regarding the trajectory of the forklift itself based on the sensor data at the node and/or any other information available to the forklift's node such as recent positions of other nodes. The local trajectory model may be able to alert the driver that the forklift is approaching a hazard. The first level of alarm may be sufficient to deal with static hazards.

The second level of alarm may be generated by the near edge trajectory model operating at the central node. The near edge trajectory model provides a more accurate estimation of the relative position of each forklift relative to the other objects in the environment. The second level of alarm may be more accurate when dealing with dynamic hazards, such as other moving forklifts. However, even the first level of alarm can provide insight into hazards faced by a forklift in its current trajectory and/or predicted trajectory.

FIG. 1 discloses aspects of an environment in which embodiments of the invention may be deployed or implemented. FIG. 1 illustrates a logistics system that includes edge nodes 102, 104, 106, and 107 and a central node 114. The edge nodes and the central node may coordinate to perform logistics operations.

The environment 100 may be a warehouse or other environment. The nodes 102, 104, 106, and 108 operate or exist in the environment 100. In the context of a warehouse environment, the nodes 102, 104, 106, and 108 may have different types and correspond to or are associated with objects related to the warehouse environment. In the present example the nodes 102 and 104 may correspond to or are associated with forklifts. The nodes 106 and 108 may correspond to or be associated with other objects (e.g., machinery, hazards, persons, corridors, corners, shelving) that may be mobile, movable, or stationary and which are hazards from the perspective of the forklifts.

Each of the nodes 102, 104, 106, and 108 may be associated with or include sensors. The array of sensors may depend on the associated object. The nodes 102, 104, 106, and 108 may include compute resources such as a processor, memory, networking hardware, or the like.

A central node 114 (e.g., implemented in a near edge infrastructure) may be configured to communicate with each of the nodes 102, 104, 106, and 108. The communication may be performed through hardware such as a router or gateway or other devices. Depending on the sensor and the configuration of the node, the communication may be one way. For example, a pallet associated with an RFID tag may simply be read to determine the pallet's position. A forklift, in contrast, may also receive information from the central node 114 and use the information to perform logistics operations.

For example, the node 102, which may be attached to or an integral part of an object such as forklift, may be configured with sensors of various types and with sufficient hardware (e.g., processor, memory) to implement and run a local trajectory model 124. Other forklifts in the environment may also include or be associated with a local trajectory model.

For example, if the node 102 corresponds to or is associated with a forklift, the sensors of the node 102 may be arranged on the forklift in different manners. For example, position sensors may be deployed on the forklift's arms (forks or tines). By placing sensors on the arms, the positions of the arms relative to the forklift body and in the environment 100 can be determined. In one example, the sensors of the node 102 allow a center position of the node to be determined. The position sensors generate positional data that determine a position of the forklift. Positional data can also be collected as time series data, which can be analyzed to determine a position of the forklift, a velocity of the forklift, a trajectory or direction or travel or the like. Over time, the movements of the forklift can be learned such that the anticipated trajectory, which may not be a straight line, can be determined or predicted.

In one example, a map of the environment is generated and may be stored at the central node and/or at the edge nodes. The logistics system is configured to map the position data received from the nodes into the map of the environment. This allows the positions of all nodes (objects) to be determined with respect to each other and with respect to the environment 100.

The central node 114 may include a near edge trajectory model 116, a sensor database 118, and hazard knowledge 120. The sensor database 118 may be configured to store sensor data received from the nodes 102, 104, 106, and 108 and/or other nodes in the environment 100. Because the nodes are associated with or integrated with objects, the sensor database 118 corresponds to information about the objects. More specifically, the sensor database 118 may be used to store the position information generated by forklifts.

The hazard knowledge 120 includes information relative to the hazards, represented by the hazards 110 and 112, in the environment 100. The hazards 110 and 112 represent relevant aspects of the operational area, which may include movable and/or static objects. In one example, a defined area may also constitute a hazard. By way of example only, the local trajectory model 124 is associated with the first alarm level and the trajectory model 116 is associated with the second alarm level.

In one example, the local trajectory model 124 is trained at the central node 114 and/or the cloud 122 and deployed to the relevant nodes (e.g., mobile objects such as forklifts). The local trajectory model 124 is trained using available (historical) positioning and/or inertial measurement data. After training, the local trajectory model 124 may be deployed. In one example, the trajectory model 116 and the local trajectory model 124 are the same.

Figure 2:
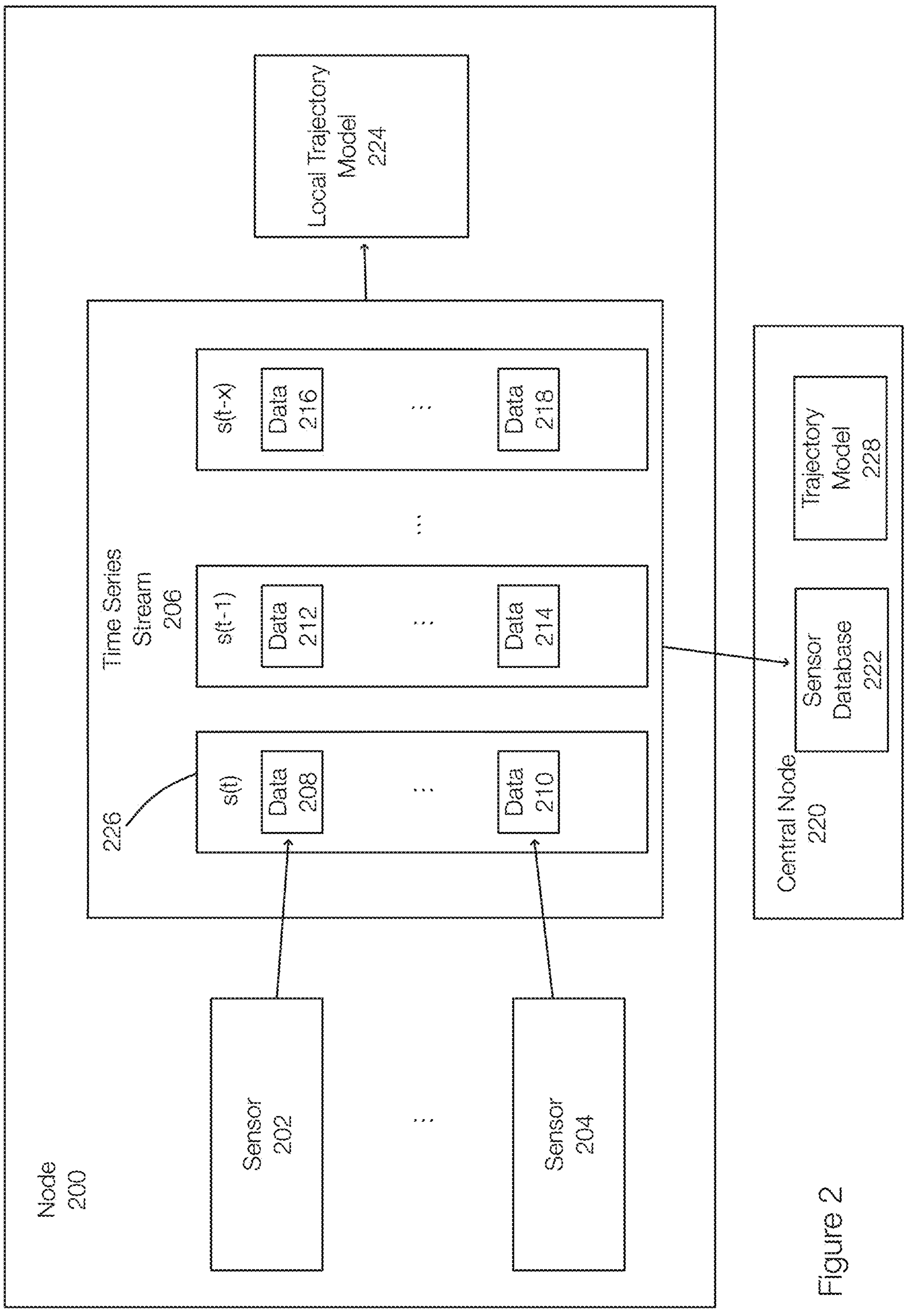
FIG. 2 discloses aspects of a logistics system that includes a node associated with or integrated with an object and a central node configured to communicate with the node.

FIG. 2 discloses aspects of a node associated with or integrated with an object and configured to operate in an environment and perform logistics operations. The node 200 may include sensors, represented by sensors 202 and 204. The node 200 collects, over time, multiple readings from the sensors 202 and 204 that constitute a time series stream 206. For example, the stream 206 includes readings at different times and the data collected at a particular time may be referred to as a collection. Thus, the time series stream 206 may include multiple collections such as the collection 226.

The data 208 and 210 were collected at time s(t), the data 212 and 214 were collected at time s(t−1), and the data 216 and 218 were collected at time s(t−x). Each of the nodes that includes sensors may generate a similar sensor data stream. Data generated from the sensors 202 and 204 may be collected periodically, whenever a change in a sensor's data is detected (e.g., acceleration or deceleration is detected), or the like or combination thereof. Data from the sensors 202 and 204 may be collected at different times. Further, the sensors 202 and 204 may be grouped by type (e.g., position sensors, acceleration sensors, temperate sensors) and each data from each type or from designated groups of sensors may be collected separately.

The data collected from the sensors 202 and 204 is associated with or includes position data that can be mapped into coordinates of the environment 100. Thus, for the collection of data associated with time s(t), a position p(t) is associated with the collection 226 of data. When collecting data from the sensors 202 and 204, the collection of data is typically correlated to a position in the environment. In addition to position data, sensors may also provide inertial measurements of acceleration and deceleration as well as, for objects such as a forklift, mast position, load weight, or the like. The data collected from an object may depend on the object.

The time series stream 206 may be transmitted to a central node 220 and stored in a sensor database 222 of or associated with a central node. Thus, the time series stream 206 is available for use by the local trajectory model 224, which may generate an alert. The time series data from all nodes is available to the near edge trajectory model 228.

The time series stream 206 may be collected periodically at the central node 220. This allows the central node 220 to store, in addition to hazard knowledge 120, sensor data 222 from each of the nodes. Stated differently, the central node 220 may store position data related to both dynamic and static nodes.

Figure 3:
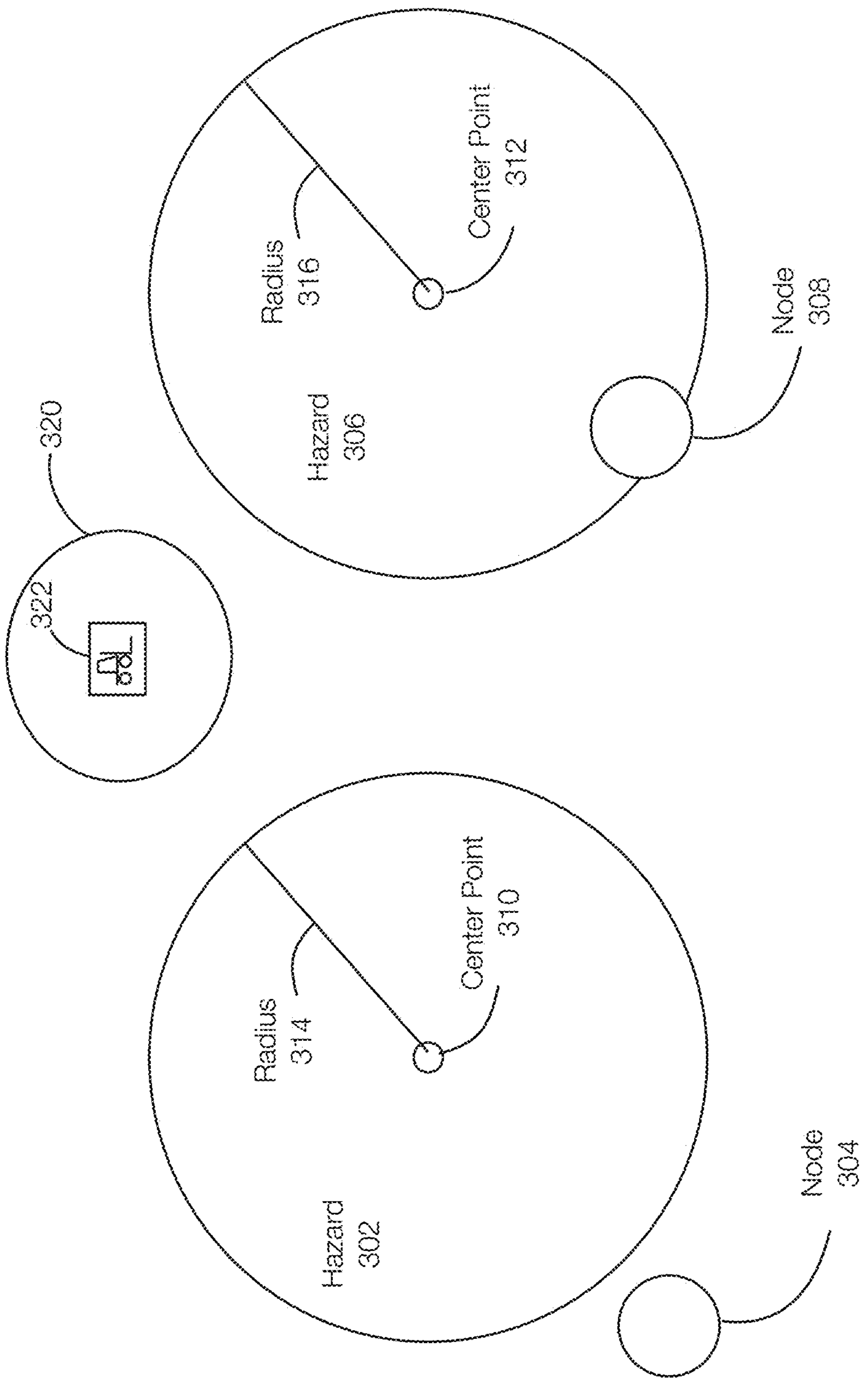
FIG. 3 discloses aspects of a proximity event and the detection thereof.

FIG. 3 discloses aspects of a proximity event that may be generated by a node and/or by a central node. FIG. 3 illustrates a hazard 302, which corresponds to an object in the environment. Thus, the hazard may be a mobile object, a movable object, or a static object. The hazard 302 may be defined by a circle having a center point q 310 and a radius r 314. For a static hazard, the center point 310 corresponds to a center 310 of the hazard zone and the radius 314 is defined in a domain-dependent fashion. Typically, the radius 314 is set to cover the entire area of interest. The area of interest covered by the circle may be larger than the hazard itself. The circle 320 represents an example area of interest for a forklift 322. The size of the area of interest may vary according to the type of hazard. A moving hazard, for example, may have a larger area of interest than a static hazard due to the uncertainty in position prediction.

If the shape of the hazard does not lend itself to a circular representation, the hazard may be represented as more than one hazard with overlapping areas. For example, a pillar is an example of a stationary hazard or object. The position of the hazard 302 is mapped to a mapping of the environment. The radius 314 of the hazard may be larger than the actual dimensions of the hazard 302. This allows embodiments of the invention to essentially generate an alert when the node 304 is within the radius 314 associated with the hazard 302. The radius may be determined by an administrator and may have minimum and maximum values.

For a dynamic hazard 306, the center point 312 corresponds to the last known position of the hazard 306 in one embodiment. When performing logistics at a node, the center point 312 is the last position known to the node. The radius 316 of the hazard 306 may be defined based on the uncertainty over the current position of the hazard 306. This may be a function of the elapsed time since the last actual position of the hazard 306 was known. Further, the radius 316 of the hazard 306 may be scaled according to the danger that the hazard 306 represents to the operation of other objects in the environment.

In this example, a proximity event (an example of an alert) is not triggered for the node 304 with respect to the hazard 302 because the distance between the node 304 and the center point 310 is greater than the radius 314 of the hazard 302. A proximity event is triggered for the node 308 with respect to the hazard 306 because the distance between the center of the node 308 and the center point 312 is less than the radius 316 of the hazard 306.

For hazards (the objects or nodes) in the environment, the hazard area may be defined by a point q that is the last known position and a radius r. When the hazard is mobile, the radius r may relate to how fast the forklift moves in the domain. Alternatively, the point q may include a predicted position of the forklift based on a last known position. In this case, the radius r should reflect the uncertainty over the prediction. The generation of an alert may thus be determined based on q, p, and r using, by way of example, a Boolean function Hazard(p, q, r). Generally, if the position of the node being evaluated is within r of a hazard, the function is true and an alert may be generated. A false output does not cause an alert to be generated.

Figure 4:
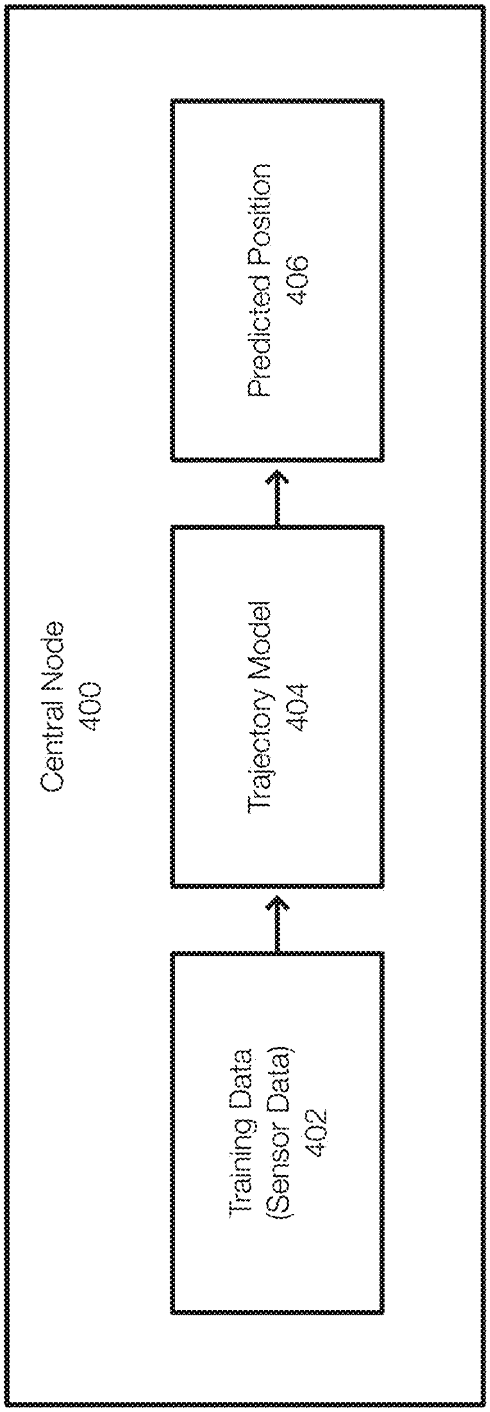
FIG. 4 discloses aspects of a central node configured to train and deploy a trajectory model to multiple nodes.

FIG. 4 discloses aspects of training a trajectory model. The trajectory model 404 is trained, in one example, at the central node 400. The training data 402 includes data received from the nodes in the environment The training data may include, by way of example only, historical position data and/or historical inertial data. The output of the trajectory model 404, once trained and operating with new sensor data, may include a predicted position 406.

In one example, the trajectories of dynamic nodes may be segmented in fixed duration segments. A Hidden Markov Model may be obtained to generate predicted trajectories of the same duration. In another example, a map of typical trajectories can be used to determine whether a node's current trajectory is similar to a frequent trajectory in the domain. In another example, the trajectory model 404 may be a neural network that is trained with the training data 402.

Regardless of how the trajectory model 404 is implemented, the model 404 typically receives collections of sensor data from a specific node to generate a predicted position for that node after k instants (k may be a domain-dependent that typically corresponds to a few seconds of real time operation).

More specifically, the input to the near edge trajectory model 404 may include collections of data (from each node $E_i$):

$$s_t^i, s_{t-1}^i, s_{t-2}^i, \ldots$$

This model 404 then generates a predicted position for each node $E_i$ as $p_{t+k}^i$.

In this example, the model 404 may take an input of three consecutive collections from each node or forklift $E_i$. Thus, the model 404 may generate a prediction based on a current position and two most recent positions. The number of collections to be considered by the model 404 is not limited to three but may be larger or smaller. However, the number of collections considered by the model 404 after the model is trained should not exceed the maximum number of collections stored at locally at the nodes. Training can continue and the models deployed to the nodes can be updated over time or as needed.

Figure 5A:
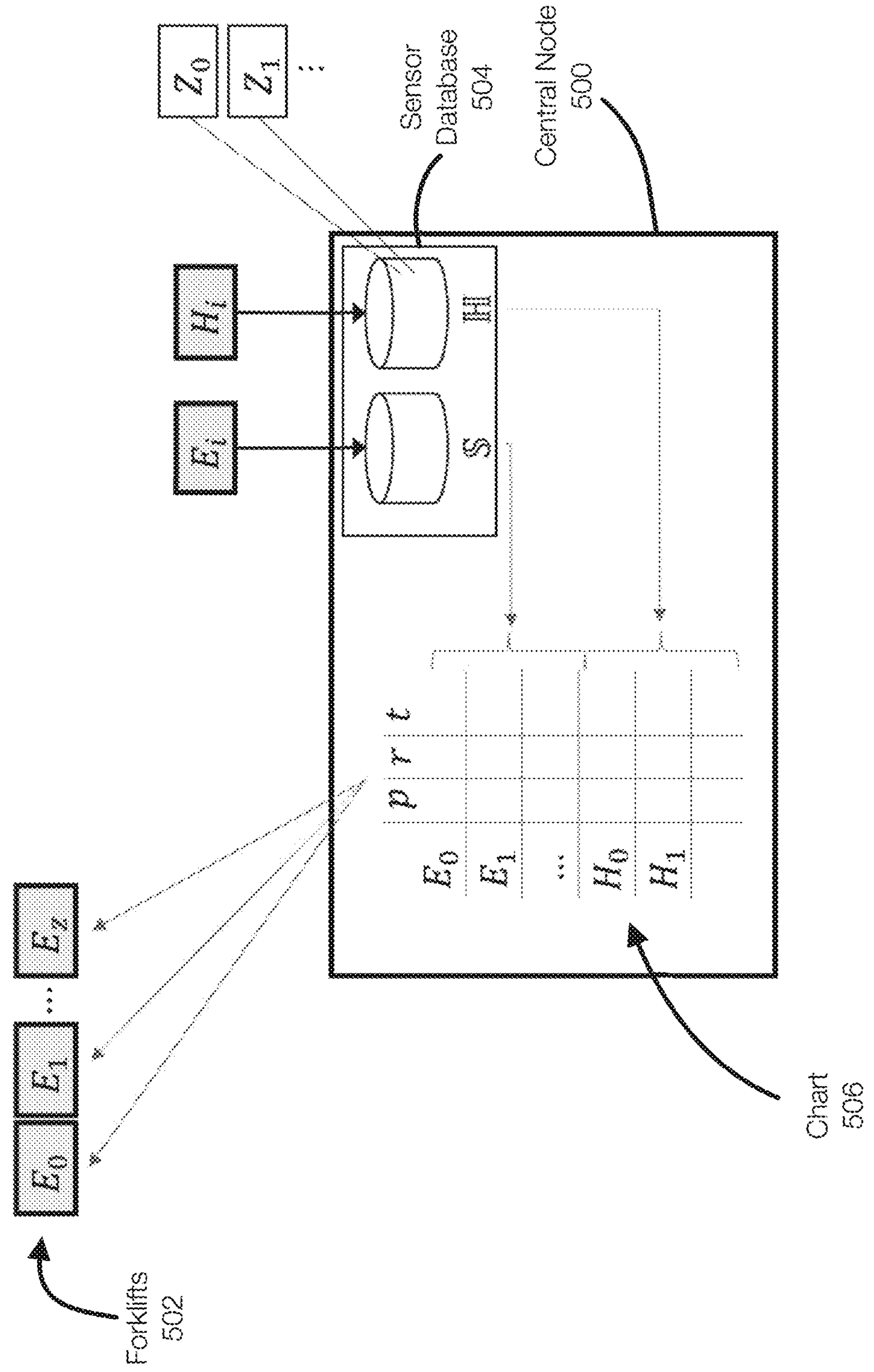
FIG. 5A discloses aspects of a central node configured to update edge nodes with at least position information.
Figure 5B:
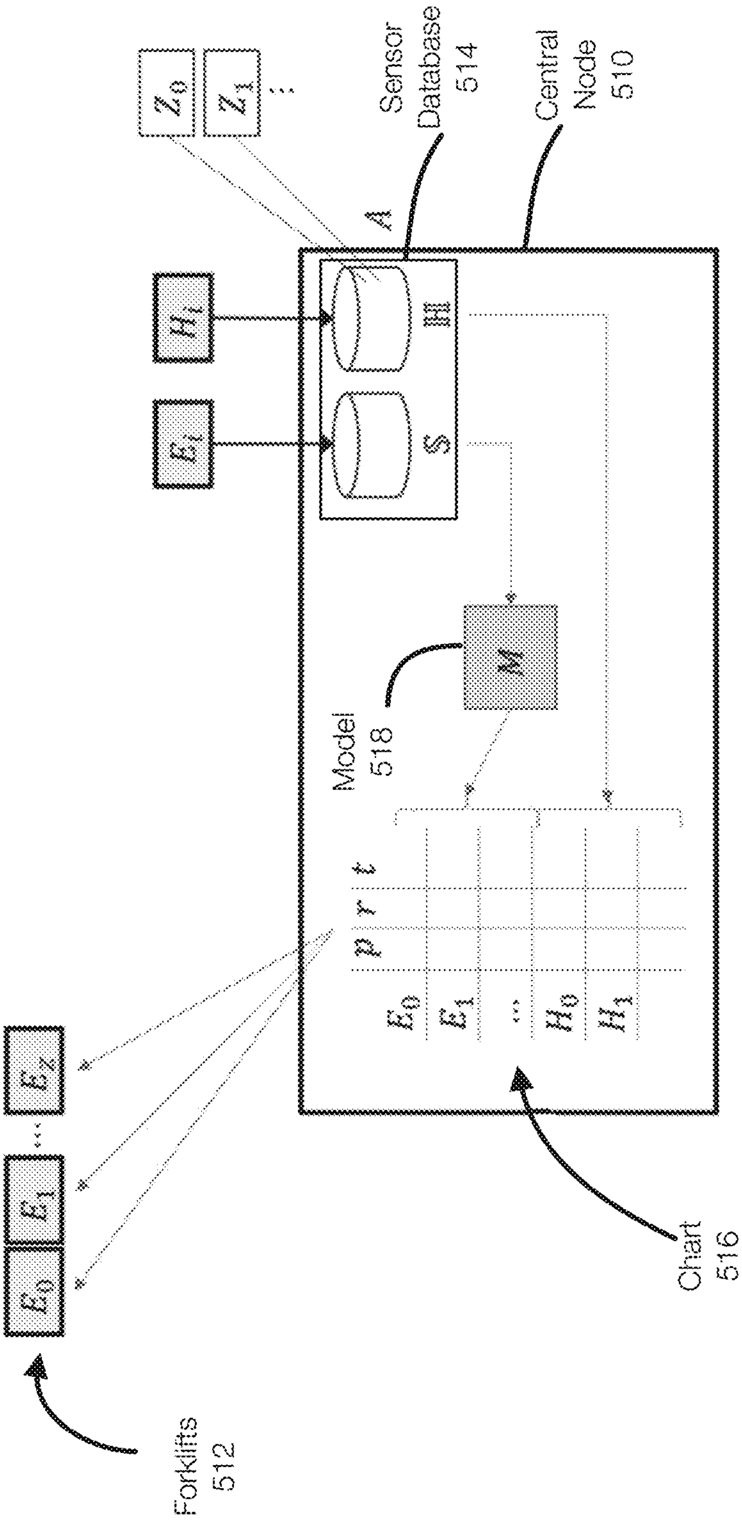
FIG. 5B discloses aspects of a central node configured to update edge nodes with at least predicted position information.

FIG. 5A discloses aspects of updating node positions stored locally at nodes. FIG. 5B discloses aspects of updating predicted positions stored at nodes. FIG. 5A illustrates a central node 500 that receives sensor data from each of the forklifts (or nodes), represented by $E_i$, and other nodes or hazards, represented by $H_i$. The sensor data received from the forklifts is stored in a sensor database 504, which includes sensor data $\mathbb{S}$ from the forklifts and position data $\mathbb{H}$ from other hazards. In this example, the position data $\mathbb{H}$ corresponds to stationary and/or movable hazards in the environment. In the case of a warehouse environment, the position data $\mathbb{H}$ may correspond to objects that are not forklifts. This position data $\mathbb{H}$ may be static or may change less frequently. For example, a pallet may be associated with an RFID sensor. If the pallet is moved, this information may be detected and transmitted to the central node. The position data $\mathbb{H}$ may then be updated and broadcast to the nodes 502 as necessary.

As illustrated in the chart 506, data for each of the forklifts and hazards may be generated. The generated data includes a position, a radius, and a time (p, r, t). This information may be periodically broadcast to the forklifts 502 ($E_1 \ldots E_z$). Thus, the forklifts (or other nodes) that receive this broadcasted information are aware of the positions of other forklifts and are provided with the time of that position and a radius. In one example, the central node 500 may only transmit position and timestamp information to the forklifts 502. In this case, the forklifts 502 have the capability to derive the radius r that defines the hazard areas. Thus, FIG. 5A illustrates an example of updating nodes or forklifts 502 with the most recent known position.

FIG. 5B discloses aspects of updating node positions. In FIG. 5B, a trajectory model 518 is also illustrated. The trajectory model 518 uses the sensor database 514 to generate predicted positions, as illustrated in the chart 516. In this example, the predicted positions of the forklifts 502 or other nodes are broadcast to the forklifts 512. In FIG. 5B, the hazard area defined by the predicted position p of the forklift (or object or node) and the radius r is adjusted to account for the uncertainty of the predicted position relative to the actual position.

Figure 6A:
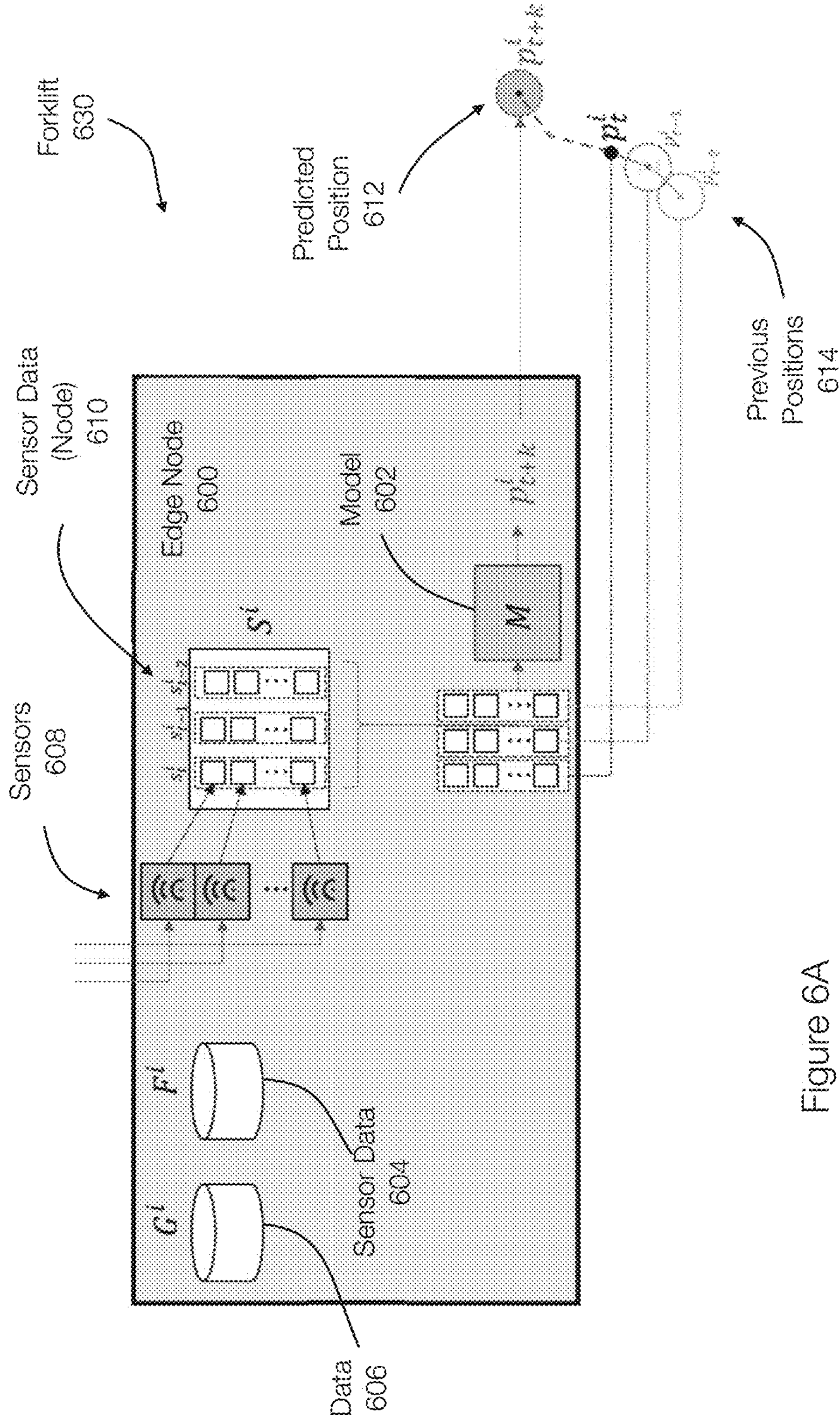
FIG. 6A discloses aspects of generating a predicted position at an edge node.

FIGS. 6A-6F disclose aspects of a first level alarm, which may be generated on an edge node of the logistics system. FIG. 6A discloses aspects of predicting a position of a forklift 630, which includes or is associated with an edge node 600. The edge node 600 includes a trajectory model 602 configured to predict a position of the forklift 630. The model 602 may have been trained at a central node as previously described and then deployed to the node 600.

In this example, the node 600 includes sensors that generate sensor data 610 $S^i$. The sensor data 610 includes collections of sensor data corresponding to different points in time. For example, the sensor data $s_t^i$ corresponds to the position $p_t^i$ in FIG. 6A. The other previous positions 614 ($p_{t-1}^i$ and $p_{t-2}^i$) have a similar correspondence to the collections ($s_{t-1}^i$ and $s_{t-2}^i$) of sensor data 610.

The node 600 also includes data 606 $G^i$. The data 606 corresponds to the hazards (static and dynamic) in the environment or domain known to the node 600. The hazards associated with the data 606 are associated with hazards or nodes that are not forklifts in this example. The sensor data 604 $F^i$ corresponds to position data for other forklifts in the environment or domain. More specifically, the sensor data 604 contains the last known positions or last known predicted positions of other forklifts in the domain. The data 606 and the sensor data 604 are received from $\mathbb{H}$ and $\mathbb{S}$, which are stored at the (see FIGS. 5A and 5B) central node 500.

Figure 6B:
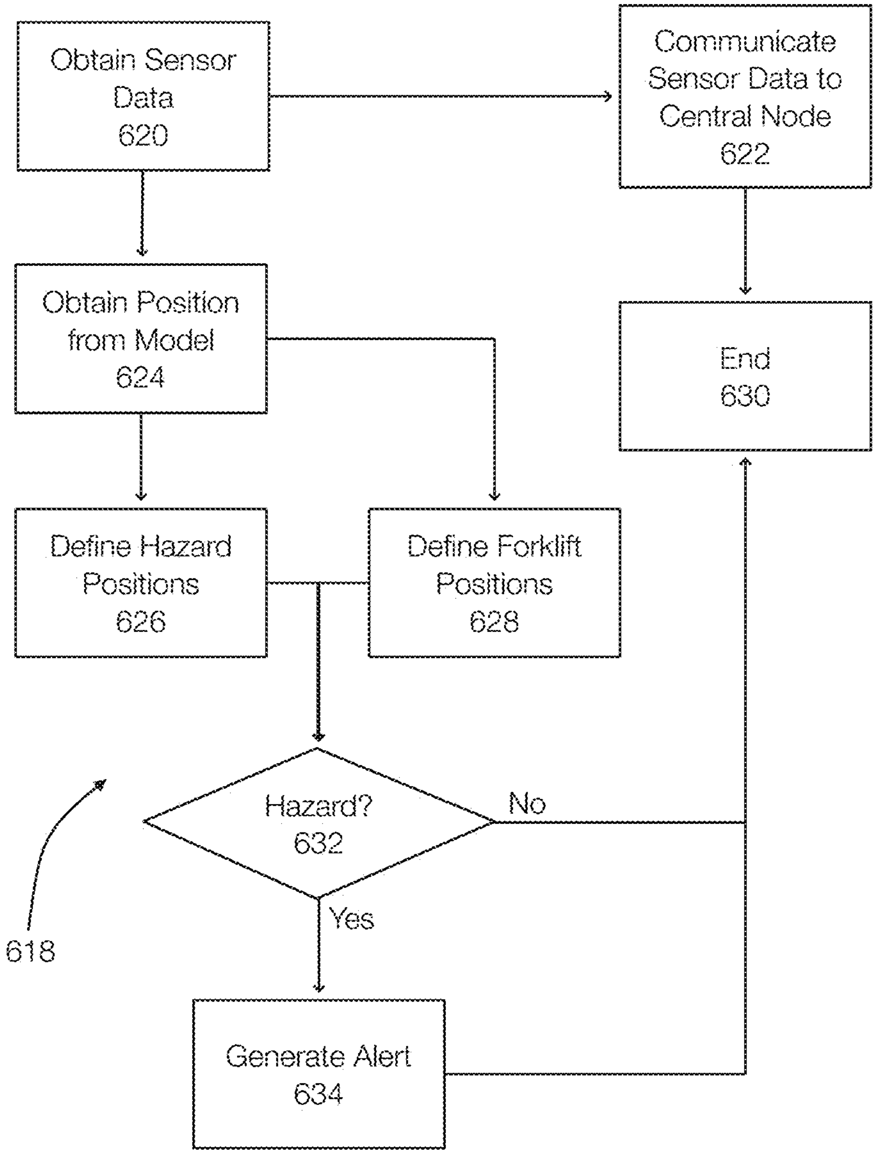
FIG. 6B discloses aspects of a method for generating a first level alert at an edge node.

FIG. 6B discloses aspects of generating a first level or first stage alert or alarm. Elements of the method 618 may be performed in parallel, concurrently, separately, or the like. With reference to FIGS. 6A and 6B, the node 600 may obtain 620 sensor data from its sensors in the method 618. For example, the node 600 $E^i$ obtains sensor data $s_t^i$, which includes $p_i$ of the node 600 $E^i$.

The node then communicates 622 the sensor data to the central node and this portion of the method 618 ends 630. This allows the central node to update the position of the node 600 at the central node and store the position in the sensor data $\mathbb{S}$. Further, this position of the node 600 sent to the central node will be broadcast to other nodes in the system.

Using one or more collections of data, such as $s_t^i$, $s_{t-1}^i$, $s_{t-2}^i$, which is stored at the node 600 locally as the sensor data 610 $S^i$, the node 600 uses its trajectory model to obtain 624 a predicted position 612 $p_{t+k}^i$. Using the data 606 $G^i$, the node 600 then determines q and r for each known hazard in $H^i$. This information was previously transmitted to the node 600 by the central node. Using the data 604 $F^i$, the node 600 determines q and r for each of the other nodes (forklifts) $E_j$.

Using the predicted position of the node 600, and the q and r values of the hazards and other forklifts or nodes, the method 618 determines 632 whether a hazard is present using a function such as Hazard($p_{t+k}^i$, q, r). This function may be invoked for each hazard and for each of the other forklifts. If no proximity event is detected, the method 618 may end. In one example, a proximity event is detected when the predicted position (or current position) intersects with a hazard area. As previously stated, the hazard area (e.g., size and location in the environment) may be defined based on the radius r and the center point of the hazard q. If a hazard or proximity event is detected, an alert or alarm is generated 634. This alert is an example of a first level alert and is generated 634 locally at the node 600. Thus, the operator is apprised of the proximity event.

Each of the nodes (e.g., the forklifts) may perform the method 618 periodically. This allows each of the nodes to generate local alerts based on their own predicted positions and the known positions (or predicted positions if known or relevant) of other hazards and nodes in the environment.

Figure 6C:
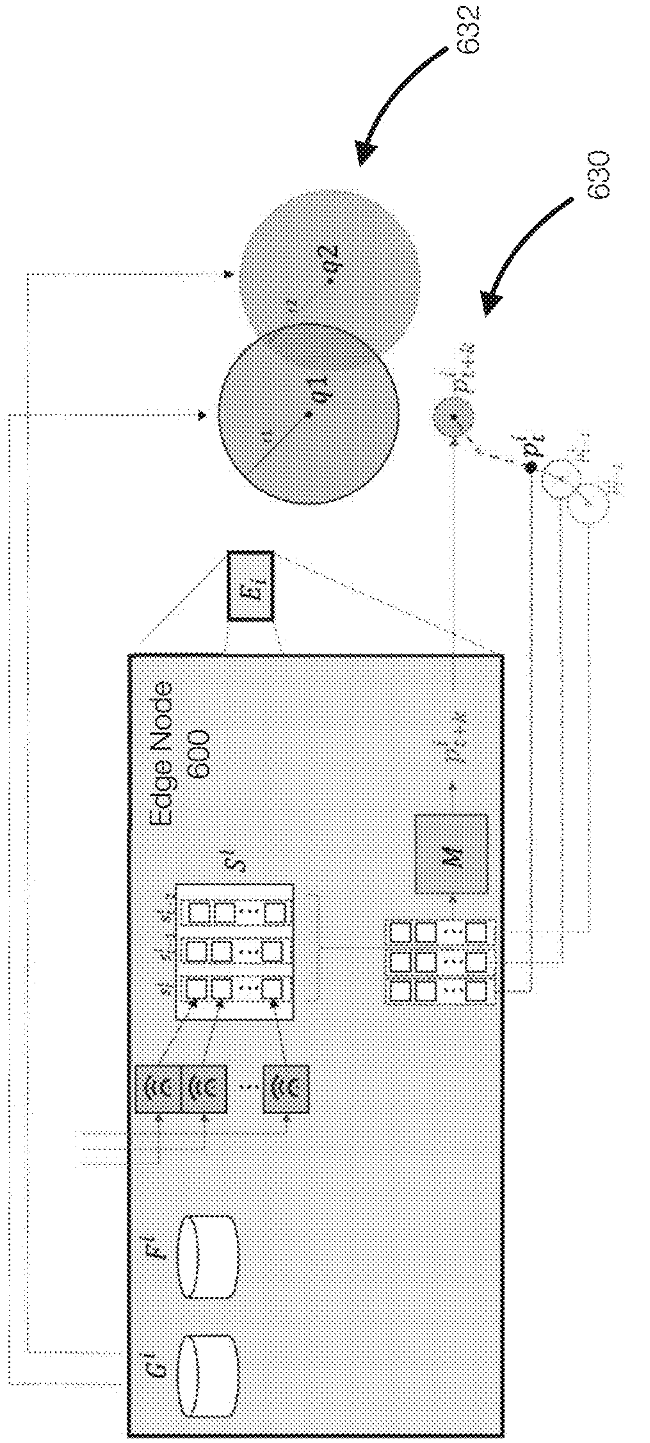
FIG. 6C discloses aspects of generating a first level alert based on a predicted position of a node and a recent position of a hazard.

FIGS. 6C-6F build on FIG. 6A and illustrate potential scenarios. FIG. 6C discloses an example of generating an alert. In this example, the predicted position 630 does not generate a proximity alarm for either of the hazards 632. The hazard areas of the hazards 632 are stored in $G^i$ or are derived from their last known positions defined by a point q and a radius r.

Figure 6D:
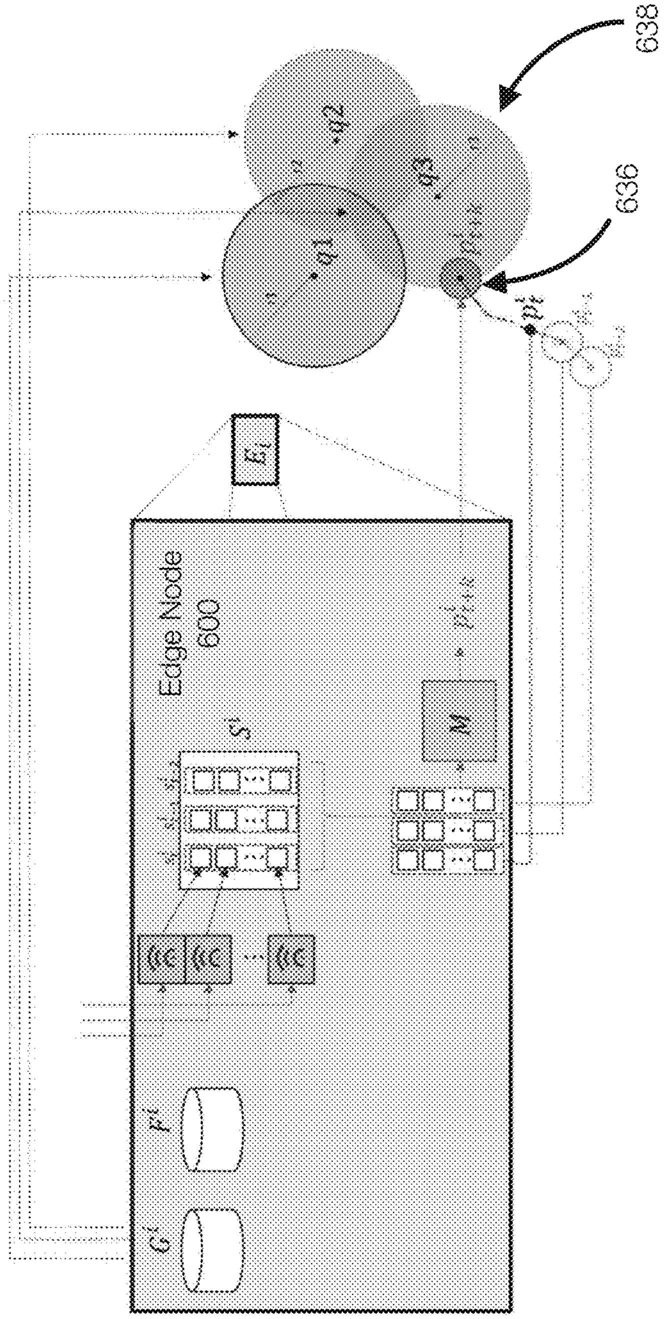
FIG. 6D discloses aspects of generating a first level alert based on a predicted position of a node and a recent position of a hazard.

FIG. 6D discloses aspects of generating a first level alert. FIG. 6D illustrates an example where an alert or proximity alarm is raised with respect to a known hazard 638. In some embodiments, the edge node 600 may generate an alarm for each hazard for which the hazard function is true. Thus, each hazard may be associated with or result in an alert. The operator of a forklift may be apprised of a proximity event with respect to more than one hazard, for example. Similarly, alarms generated at other forklifts or nodes may be performed in a similar manner where the corresponding node uses the last known positions of the other nodes (or predicted positions when available).

Figure 6E:
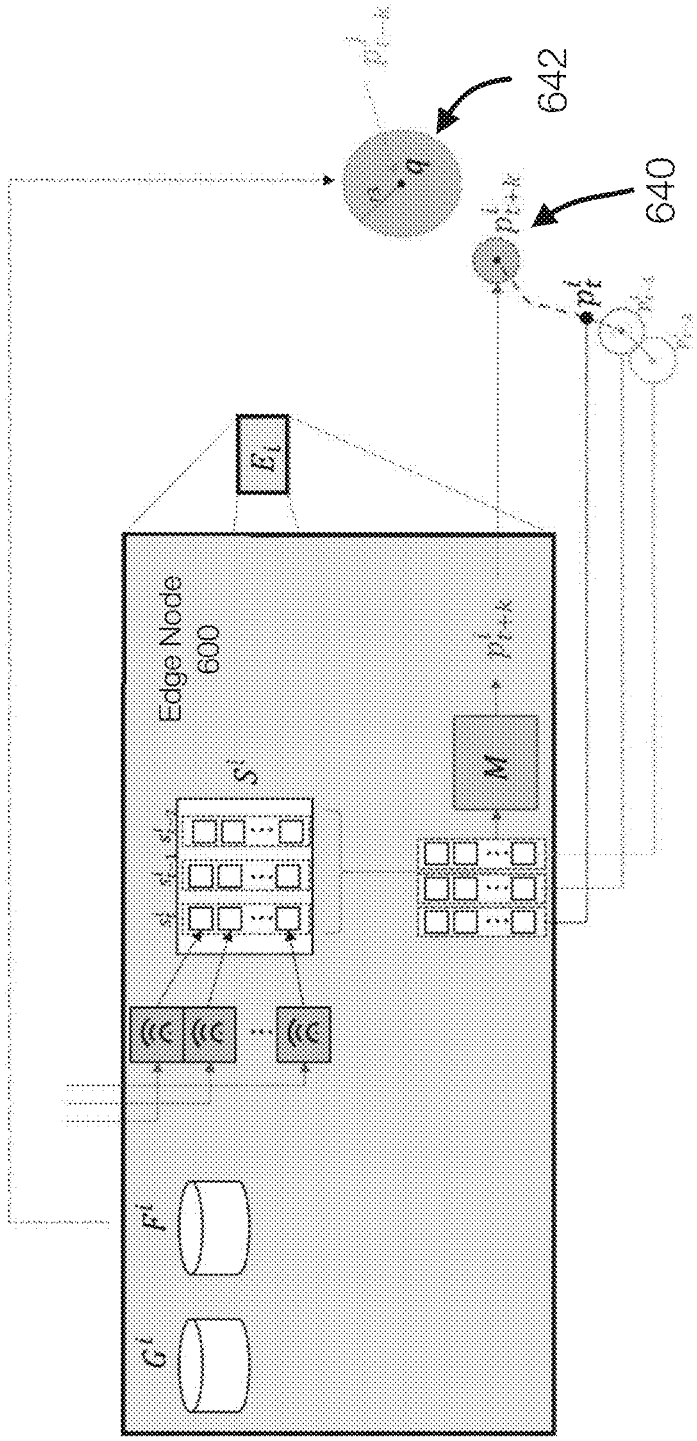
FIG. 6E discloses aspects of generating a first level alert based on a predicted position of a node and a predicted position of a hazard.

FIG. 6E discloses aspects of triggering alarms with respect to other nodes such as forklifts. FIG. 6E illustrates that a proximity alarm is not triggered with respect to another node or forklift. The method 618 may be performed with respect to the position 642 $p_{t-k}^i$ (this is the most recent known position) of another forklift. More specifically in FIG. 6E, the predicted position 640 for the node 600 at time (t+k) is evaluated in the context of the last known position 642 of another node at time (t−k).

Figure 6F:
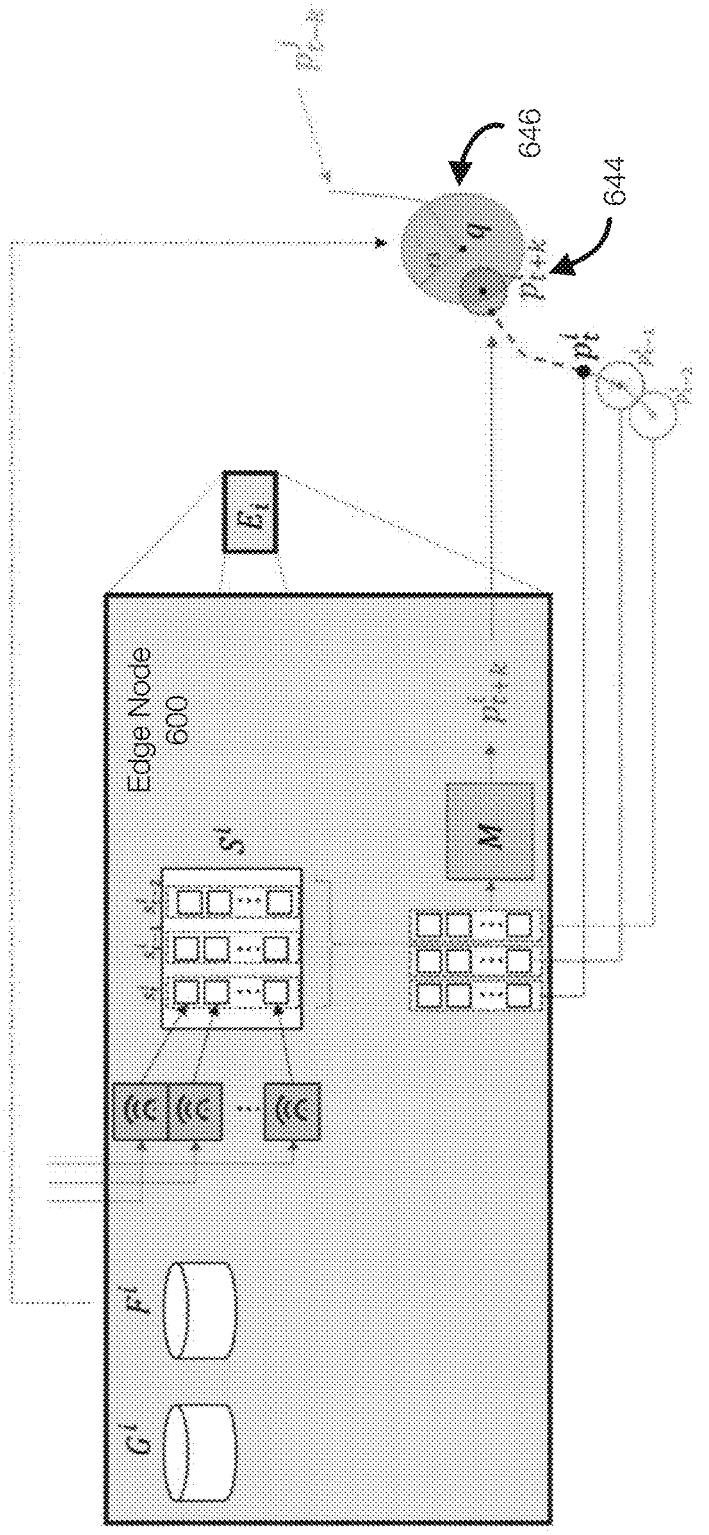
FIG. 6F discloses aspects of generating a first level alert based on a predicted position of a node and a predicted position of a hazard FIG. 7 discloses aspects of generating a second level alarm at a central node.

FIG. 6F discloses aspects of raising a proximity alarm. In FIG. 6F, a proximity alarm or alert is generated because the predicted position 644 of the node 600 overlaps with the last known position 644 $p_{t-k}^i$ of another node or forklift.

In another example, the predicted positions of forklifts are generated at the central node and broadcast to the nodes. This allows an alert to be generated or not generated based on a comparison of the predicted positions of the nodes. Thus, the position of the node 600 at time (t+k) is compared to the predicted positions of other forklifts at time (t+k).

A second level alert or alarm may be generated at the near edge or at the central node. The central node has, for a point in time t, a last known position or a last known predicted position for all relevant objects (e.g., forklifts) in the environment. This allows a similar hazard function to be performed for each node or forklift pair ($E^i$, $E^j$). Each node $E^i$ will receive zero or more signals related to a proximity event. Each node $E^i$ can then raise a second level alarm and/or use signals or information received from the central node for additional decision making.

Figure 7:
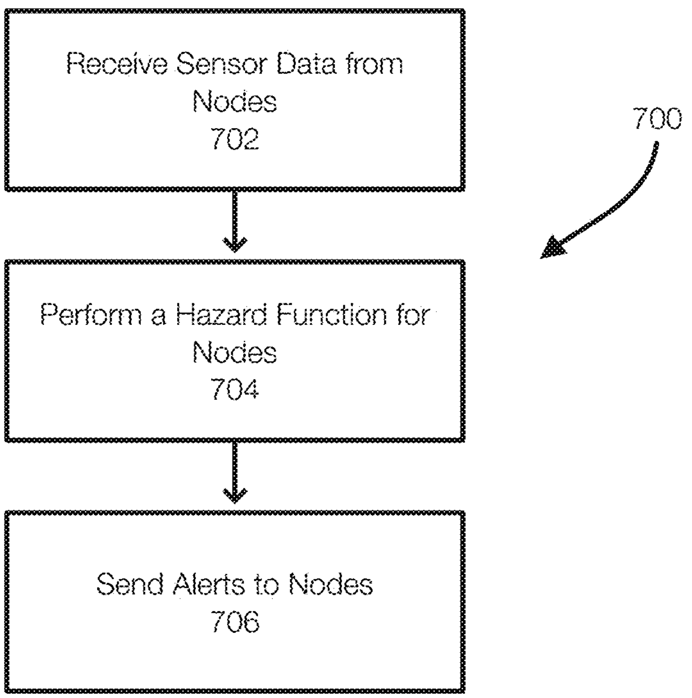

FIG. 7 discloses aspects of generating a second level alarm. In the method 700, the central node received 702 sensor data from the nodes. The central node may receive sensor data from nodes such as forklifts regularly or periodically. For example, every second, every two seconds, or at a faster or slower rate. The central node may also receive data from other nodes less frequently. Position data for nodes or hazards associated with RFID tags, for example, may be generated less frequently. This data collected from the edge nodes (the forklift/nodes, the movable nodes, and/or static nodes) may be stored in a sensor database (e.g., $\mathbb{S}$ and $\mathbb{H}$). This information or most recent entries in $\mathbb{S}$ and $\mathbb{H}$ are broadcast to the relevant nodes as needed or periodically.

Next, the central node performs 704 a hazard function on the nodes. This may be performed using the near edge trajectory model. In effect, the central node can perform logistics operations such as hazard detection for all of the forklifts in the environment. If a proximity event is detected, an alert is sent 706 to the affected nodes or forklifts. The method 700 can run continuously.

The first-level alert may be provided as an actual alarm and may be fast enough to influence the real-time operation of the forklift or other object. The second-level alarm may be delayed with respect to the first-level alarm and may still be fast enough to influence the real-time operation and logistics. In contrast to the edge nodes, the central node has likely received more recent information from each node or object in the domain. As a result, the trajectory predictions obtained by the trajectory model at the central node are likely to be better and more confidence may be placed in the predictions of the near edge trajectory model. This allows certain events or circumstances to be recorded or handled differently. The second-level alert or alarm, in addition to being sent to the affected nodes, can be provided to other users (e.g., a warehouse administrator) in the environment.

The response time versus confidence trade-off between the first-level alert and the second-level alert may depend on the time required for the positioning information of all forklifts and hazards to be broadcast to and from the near edge central node. If the communication and processing times are negligible, the first and second level alerts may happen in near real time and with up-to-date information.

In one example, the trajectory model at each node and at the central node are the same. However, a compressed trajectory model may be deployed to the edge nodes. The compressed trajectory models may perform more rapidly, but at the cost of accuracy in the trajectory prediction.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, logistic operations.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, virtual machines (VM), or containers.

Particularly, devices in the operating environment may take the form of software, physical machines, VMs, containers, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. The principles of the disclosure are not limited to any particular form of representing and storing data or other information. Rather, such principles are equally applicable to any object capable of representing information.

Any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: collecting a current collection of sensor data from sensors of a node, the current collection including a current position of the node, predicting a position of the node in an environment, by a local trajectory model, based on one or more collections of the sensor data, the one or more collections including the current collection and at least one previous collection of sensor data, defining a hazard area for each hazard known to the node, and generating an alarm when a proximity event is detected, wherein the proximity event is detected when the predicted position of the node intersects the hazard area of at least one of the hazards known to the node.

Embodiment 2. The method of embodiment 1, wherein the hazards known to the node include static hazards, movable hazards, and mobile hazards.

Embodiment 3. The method of embodiment 1 and/or 2, wherein node is part of or is associated with a forklift and wherein the mobile hazards comprise other forklifts in the environment.

Embodiment 4. The method of embodiment 1, 2, and/or 3, wherein each hazard area is defined by a center point and a radius.

Embodiment 5. The method of embodiment 1, 2, 3, and/or 4, further comprising sending the current collection of sensor data to a central node operating in near edge infrastructure.

Embodiment 6. The method of embodiment 1, 2, 3, 4, and/or 5, further comprising receiving, at the central node, current collections of sensor data from multiple nodes in the environment.

Embodiment 7. The method of embodiment 1, 2, 3, 4, 5, and/or 6, further comprising generating a second alert when a second proximity event is identified at the central node.

Embodiment 8. The method of embodiment 1, 2, 3, 4, 5, 6, and/or 7, a further comprising sending the second alert to nodes affected by the second proximity event.

Embodiment 9. The method of embodiment 1, 2, 3, 4, 5, 6, 7, and/or 8, further comprising broadcasting the current collection of data received from the node to the multiple nodes in the environment.

Embodiment 10. The method of embodiment 1, 2, 3, 4, 5, 6, 7, 8, and/or 9, wherein the sensor data include at least one of position data and inertial data.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
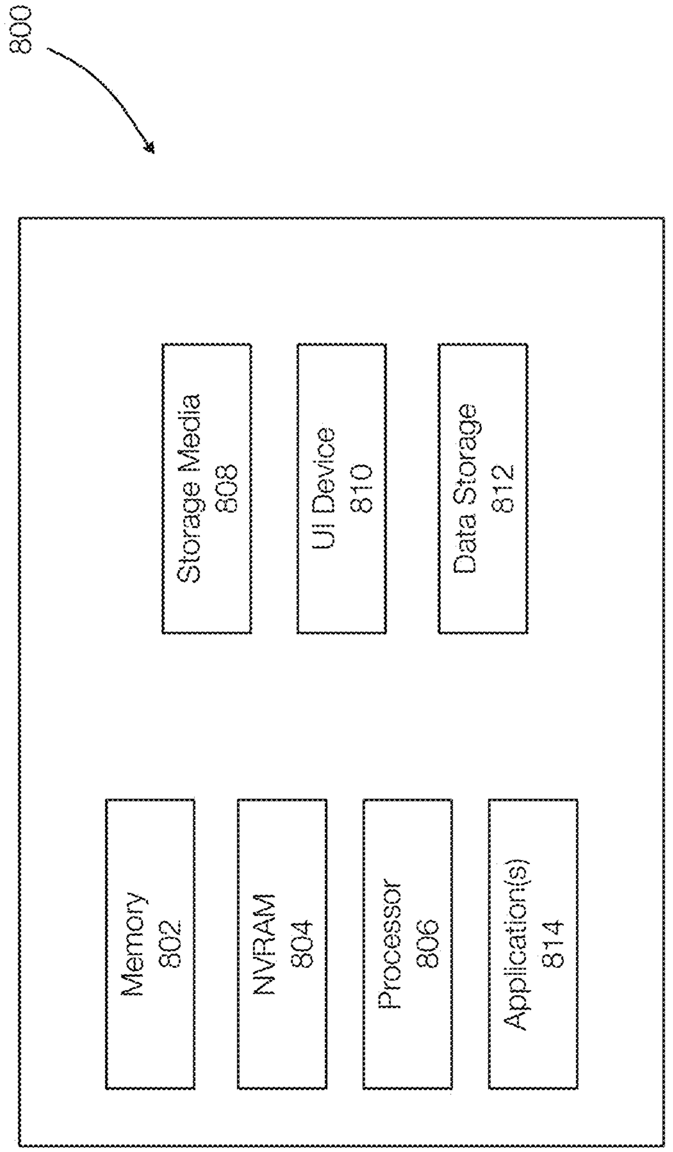
FIG. 8 discloses aspects of a computing device or a computing system.

With reference briefly now to FIG. 8 any one or more of the entities disclosed, or implied, by the Figures and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 (or computing system) includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

collecting a current collection of sensor data from sensors of a node at a local system, the current collection including a current position of the node;

receiving, at a central node, current collections of sensor data from multiple nodes in the environment;

predicting a position of the node in an environment, by a local trajectory model, based on one or more collections of the sensor data, the one or more collections including the current collection and at least one previous collection of sensor data;

defining a hazard area for each hazard known to the node, wherein the hazard area is defined by a center point and a radius and the center point is a position of the known hazard;

generating an alarm at the local system when a proximity event is detected, wherein the proximity event is detected when the predicted position of the node intersects with the hazard area of at least one of the hazards known to the node;

generating a second alert at the central node when the proximity event is identified, wherein the central node leverages most recently received current collections of sensor data from multiple nodes in the environment and the second alert more accurately predicts the position of the node than the alarm.

2. The method of claim 1, wherein the hazards known to the node include static hazards, movable hazards, and mobile hazards.

3. The method of claim 2, wherein the node is part of or is associated with a forklift and wherein the mobile hazards comprise other forklifts in the environment.

4. The method of claim 1, wherein the radius is scaled according to a danger of the known hazard.

5. The method of claim 1, further comprising sending the current collection of sensor data to a central node operating in near edge infrastructure.

6. The method of claim 1, further comprising sending the second alert to nodes affected by the proximity event.

7. The method of claim 1, further comprising broadcasting the current collection of data received from the node to the multiple nodes in the environment.

8. The method of claim 1, wherein the sensor data include at least one of position data and inertial data.

9. A non-transitory storage medium having stored therein instructions that are executable by one or more hardware processors to perform operations comprising:

collecting a current collection of sensor data from sensors of a node at a local system, the current collection including a current position of the node;

receiving, at a central node, current collections of sensor data from multiple nodes in the environment;

predicting a position of the node in an environment, by a local trajectory model, based on one or more collections of the sensor data, the one or more collections including the current collection and at least one previous collection of sensor data;

defining a hazard area for each hazard known to the node, wherein the hazard area is defined by a center point and a radius and the center point is a position of the known hazard;

generating an alarm at the local system when a proximity event is detected, wherein the proximity event is detected when the predicted position of the node intersects with the hazard area of at least one of the hazards known to the node;

generating a second alert at the central node when the proximity event is identified, wherein the central node leverages most recently received current collections of sensor data from multiple nodes in the environment and the second alert more accurately predicts the position of the node than the alarm.

10. The non-transitory storage medium of claim 9, wherein the hazards known to the node include static hazards, movable hazards, and mobile hazards.

11. The non-transitory storage medium of claim 10, wherein node is part of or is associated with a forklift and wherein the mobile hazards comprise other forklifts in the environment.

12. The non-transitory storage medium of claim 9, the radius is scaled according to a danger of the known hazard.

13. The non-transitory storage medium of claim 9, further comprising sending the current collection of sensor data to a central node operating in near edge infrastructure.

14. The non-transitory storage medium of claim 9, further comprising sending the second alert to nodes affected by the proximity event.

15. The non-transitory storage medium of claim 9, further comprising broadcasting the current collection of data received from the node to the multiple nodes in the environment.

16. The non-transitory storage medium of claim 9, wherein the sensor data include at least one of position data and inertial data.

* * * * *